United States Patent
Ma et al.

(10) Patent No.: US 10,732,852 B1
(45) Date of Patent: Aug. 4, 2020

(54) TELEMETRY SERVICE (71) Applicant: EMC IP Holding Company LLC, Hopkinton, MA (US)

(72) Inventors: Qiang Ma, Chengdu (CN); James Odis Pendergraft, Raleigh, NC (US); Hao Sun, Shanghai (CN); Jichao Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/788,383

(22) Filed: Oct. 19, 2017

(51) Int. Cl.
G06F 3/06 (2006.01)
G06F 9/54 (2006.01)

(52) U.S. Cl.
CPC ............ G06F 3/0613 (2013.01); G06F 3/065 (2013.01); G06F 3/0608 (2013.01); G06F 3/0641 (2013.01); G06F 3/0665 (2013.01); G06F 3/0689 (2013.01); G06F 3/0619 (2013.01); G06F 9/54 (2013.01)

(58) Field of Classification Search
None
See application file for complete search history.

(56) References Cited

U.S. PATENT DOCUMENTS

| 4,435,759 A * | 3/1984 | Baum | G06F 11/3466 714/44 |
|---|---|---|---|
| 9,274,710 B1 * | 3/2016 | Oikarinen | G06F 3/061 |
| 9,460,177 B1 * | 10/2016 | Pawar | G06F 16/1865 |
| 10,552,072 B1 * | 2/2020 | Bono | G06F 3/0638 |
| 2010/0082700 A1 * | 4/2010 | Parab | G06F 16/1748 707/803 |
| 2010/0107013 A1 * | 4/2010 | Mopur | G06F 11/3433 714/37 |
| 2010/0251240 A1 * | 9/2010 | Matesan | G06F 16/178 718/100 |
| 2014/0047040 A1 * | 2/2014 | Patiejunas | H04L 51/24 709/206 |
| 2015/0106578 A1 * | 4/2015 | Warfield | G06F 3/0613 711/158 |
| 2015/0121008 A1 * | 4/2015 | Boden | G06F 12/0804 711/120 |
| 2015/0253969 A1 * | 9/2015 | Tam | G06Q 10/06 715/771 |

(Continued)

Primary Examiner — Sean D Rossiter
Assistant Examiner — Stephanie Wu
(74) Attorney, Agent, or Firm — Muirhead and Saturnelli, LLC (57) ABSTRACT Techniques for request processing may include: receiving, at a data storage system, a plurality of requests from one or more clients, wherein the plurality of requests are in accordance with an application programming interface (API); collecting usage information regarding the plurality of requests; and periodically transmitting portions of the usage information to a data center. The usage information may include usage statistics regarding usage aspects of the API with respect to different types or classes of components in the data storage system. The usage information may be further analyzed for any suitable purpose such as to prioritize and identify existing features, services and/or commands for further development and improvement; identify unused or infrequently used features, commands, and/or parameters; and identify potential user interface enhancement.

19 Claims, 7 Drawing Sheets (56) References Cited

U.S. PATENT DOCUMENTS

2017/0195420 A1\* 7/2017 Resch .................. G06F 3/0619
2018/0069658 A1\* 3/2018 Benisty ................ H04L 1/0057
2018/0307425 A1\* 10/2018 Blount ................. G06F 3/0631

\* cited by examiner

| Class 610 | Operation 612 | Parameters 614 |
|---|---|---|
| Pool | Create | Pool Identifier<br>number_drives |
|  | Delete | Pool Identifier |
| Server (NAS) | Create | Server Identifier<br>Pool Identifier |
|  | Delete | Server Identifier |
| File System | Create | File system identifier<br>Size<br>thin_enabled<br>type (e.g., NFS)<br>pool identifier<br>server identifier (e.g., Id of NAS server) |
|  | Delete | File system identifier |
|  | Modify | File system identifier |

TELEMETRY SERVICE

BACKGROUND

Technical Field

This application generally relates to a telemetry service for data collection.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of techniques herein is a method of request processing comprising: receiving, at a data storage system, a plurality of requests from one or more clients, wherein said plurality of requests are in accordance with an application programming interface; collecting usage information regarding the plurality of requests; and periodically transmitting portions of the usage information to a data center. Each of the plurality of requests may be a request to perform an operation with respect to one or more objects each representing a component in the data storage system. The component may be included in a data storage system configuration of the data storage system, and the component may be any of a logical component, a physical component, and a feature or service. The component may be the logical component and the logical component may be any of a logical device, a storage pool, a file server, a file system, and a RAID group. The component may be the physical component and the physical component may be a physical storage device. The component may be the feature or service and the feature or service may be any of a replication facility, a snapshot facility. Collecting may be performed on the data storage system by a collector service that runs as a background service and that receives collected requests from a producer. The collector service may periodically persist newly received requests to a data container. The method may include: determining, by the collector service, whether one of a defined set of trigger conditions has occurred; and responsive to determining that one of a defined set of trigger conditions has occurred, performing processing by the collector service including spawning a persistence task to store usage information regarding collected requests to the data container. The defined set of trigger conditions may include a time-based condition indicating to spawn the persistence task if at least a threshold amount of time has elapsed since a last set of usage information was stored to the data container. The defined set of trigger conditions may indicate to spawn the persistence task if at least a threshold number of requests are included in an input queue and are awaiting to have associated usage information stored to the data container. A maximum number of persistence tasks may be specified and wherein at any point in time, there may be no more than the maximum number of persistence tasks currently executing in the data storage system to storage usage information to the data container. When a current number of persistence tasks executing is equal to the maximum number, the collector service may be blocked from spawning additional persistence tasks. A plurality of sets of usage information may be received by the data center from a plurality of data storage systems including the data storage system, and the method may include performing analysis at the data center of the plurality of sets of usage information. The method may also include: performing first processing of the plurality of requests to ensure that the plurality of requests are valid; responsive to determining the plurality of requests are valid, performing said collecting for the plurality of requests; and responsive to determining that one or more of the plurality of requests are not valid, determining not to collect usage information for the one or more requests determined as not valid. The usage information may include counts regarding the different operations requested in the plurality of requests. The different operations may include any of: a query request to return requested information regarding one or more entities in an existing configuration of the data storage system; a create operation that creates a new instance of an entity that is added to the existing configuration; a delete operation that deletes an existing instance of an entity currently included in the existing configuration; and a modify operation that modifies a parameter of an existing instance of an entity currently included in the existing configuration.

In accordance with another aspect of techniques herein is a computer readable medium comprising code stored thereon that, when executed, performs a method of request processing comprising: receiving, at a data storage system, a plurality of requests from one or more clients, wherein said plurality of requests are in accordance with an application programming interface; collecting usage information regarding the plurality of requests; and periodically transmitting portions of the usage information to a data center.

In accordance with another aspect of techniques herein is a system comprising: at least one processor; and a memory comprising code stored thereon that, when executed by said at least one processor, performs a method of request processing comprising: receiving, at a data storage system, a plurality of requests from one or more clients, wherein said plurality of requests are in accordance with an application programming interface; collecting usage information regarding the plurality of requests; and periodically transmitting portions of the usage information to a data center.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
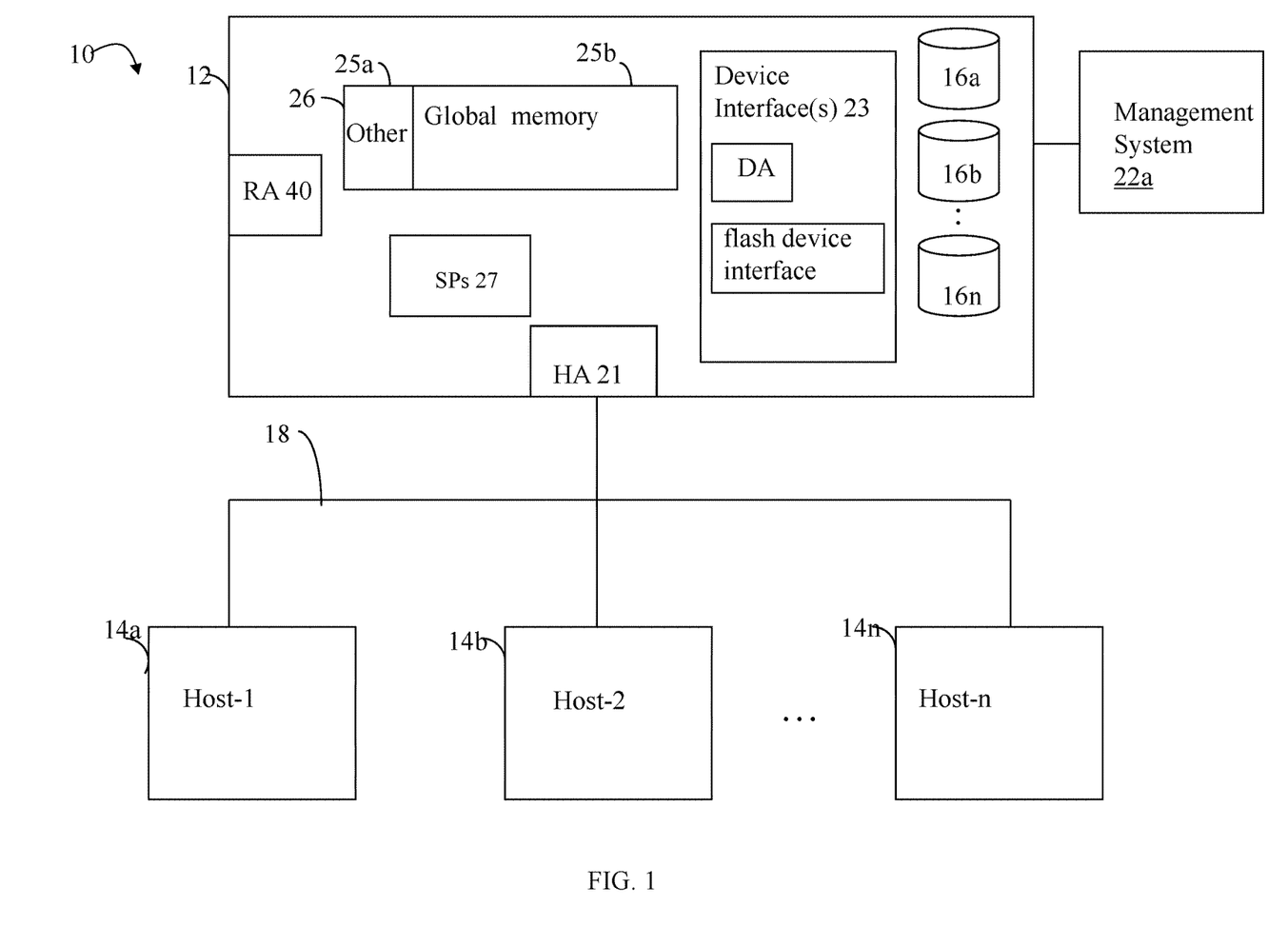
FIGS. 1 and 2 are examples of embodiments of systems that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular PD may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Management software may be used in connection with management of data storage systems. The management software, as well as more generally any software, may obtain inputs used in connection with performing an operation or task. The management software may be characterized as a client which issues requests to a server, such as a data storage system, in connection with performing requested operations. In one embodiment, the data storage system management software, as a client, may execute on one or more processors of a computer system which communicates with the data storage system that services data storage system management requests from the client. The data storage system management software included in the management system 22a may be used by an administrator in connection with performing data storage management operations. For example, the administrator may view information using a graphical UI (GUI) regarding the current data storage configuration; may perform an operation such as create or configure a logical entity such as a RAID group, LUN or LV, storage group (SG) of one or more LUNs; may configure a storage entity such as a logical entity (e.g., LUN, file system) for use with a feature storage service such as creating snapshots of the logical entity based on a defined schedule, and the like. A logical entity such as a RAID group may be represented by an object having attributes such as indicating a RAID level of the RAID group (e.g., RAID-0, 1, 5, or 6), a number of data and/or parity drives, and the like. During operation of the data storage system management application, its GUI may issue a command request such as in the form of an API application programming interface) call to the data storage system to service the command request. In response to receiving the request, the data storage system may perform processing to service the request and return a response such as, for example, including any requested data storage system configuration information.

As described in more detail in following paragraphs, the command request issued by the GUI may be, for example, to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like. The data storage system may include, or otherwise have access to, a data base, or more generally any suitable data container or data store, comprising the data storage system configuration information. The data storage system configuration information may describe the current configuration of the data storage system. The data storage system configuration information may include an object model representation of the different physical and logical entities in the data storage system. For example, the configuration information may include objects representing current configuration and state of physical entities such as physical storage devices (e.g., disks, solid state storage devices), power supplies, and the like. The configuration information may also include objects representing current configuration and state of logical entities such as RAID groups and/or storage pools (e.g., configured logical groupings of physical storage devices), LUNs having physical storage configured from such RAID groups and/or storage pools, storage groups (e.g., logical groupings of one or more LUNs), and the like.

In this manner, the data storage system as a server may service a request from the GUI (or more generally any interface or other suitable client) of the data storage system management software such as by retrieving requested data from the data storage system configuration information data base in connection with a request to get or read configuration information. Servicing performed by the data storage system may also include creating, updating and/or otherwise generally modifying the data storage system configuration information database in connection with a request, for example, to provision storage for a new LUN, create a new storage group, add new physical storage devices to the system and therefore create corresponding new objects in the database, and the like. In one embodiment, the data storage system configuration information database may include multiple tables of different types of objects. Each object may include one or more properties characterizing and describing the physical or logical entity represented by the object. Further examples and additional details regarding objects, properties, the database, client requests and server responses are set forth in following paragraphs.

In one embodiment, requests (sent from the client to the server) and responses (returned from the server to the client in response to a received request) may be in accordance with a RESTful management web services API. Additionally, in an embodiment in accordance with techniques herein using a RESTful management API, requests and responses may be transmitted in accordance with HTTP (Hypertext Transfer Protocol) where each resource, such as an object, may be identified using a uniform resource locator (URL).

Generally, as known in the art, a REST (Representational state transfer) API or RESTful API, follows and provides a client-server model. A REST API is stateless in that the client-server communication is further constrained by no client context being stored on the server between requests. Each request from any client contains all the information necessary to service the request, and session state is held in the client. HTTP based RESTful APIs may use standard HTTP methods (e.g., GET, PUT, POST, or DELETE), for example, to perform a query (e.g., GET such as to obtain property values) or perform another operation such as to create (e.g., PUT) or delete (e.g., DELETE) an object or instance of a storage entity.

Features implemented in an embodiment of a RESTful API in accordance with techniques herein may include functionality to query (e.g., read or GET) objects or other data elements such as may be stored in a database such as for a data storage system configuration, as well as perform operations that modify existing information in the database (e.g., create a new LUN).

Figure 2:
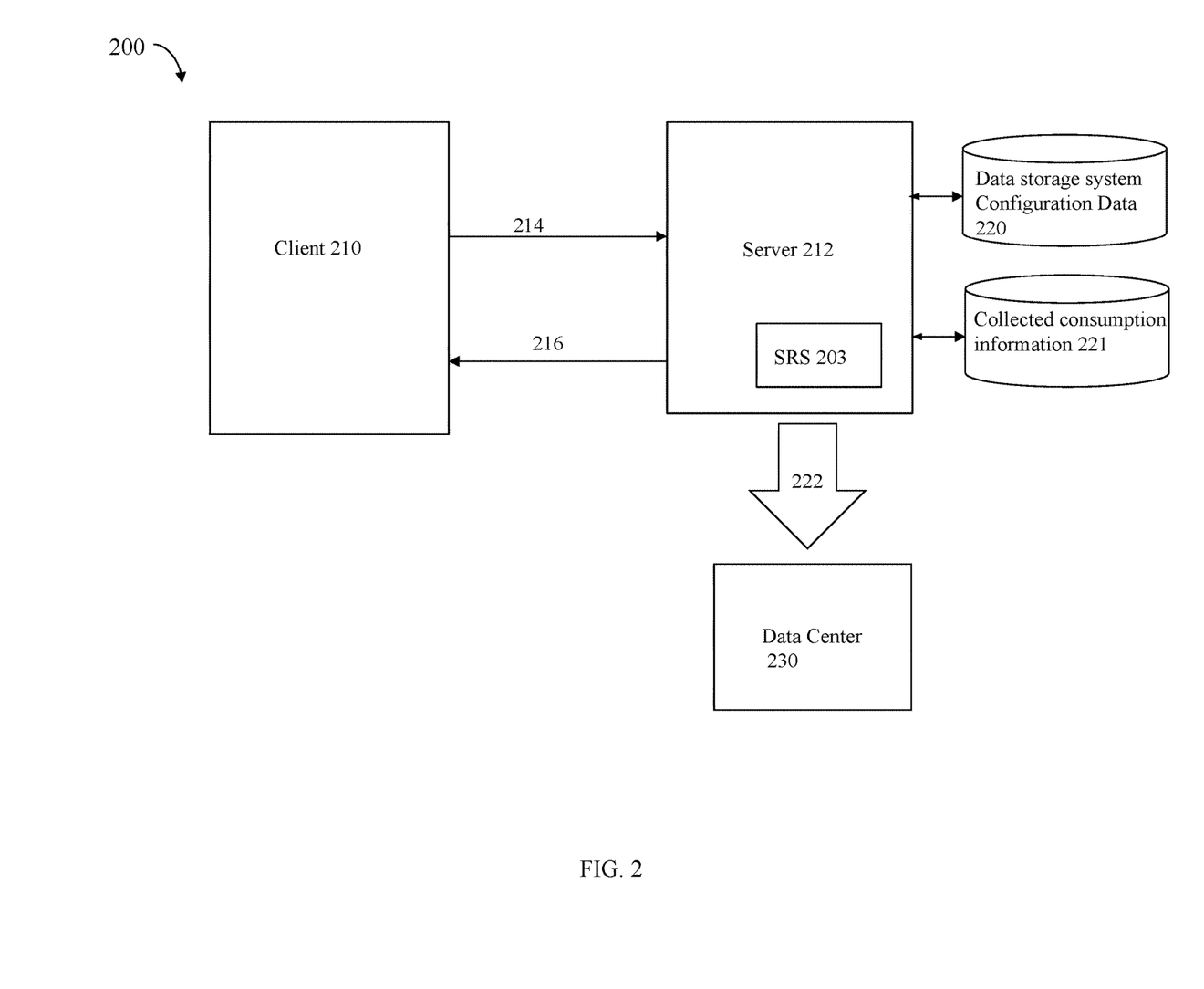

Referring to FIG. 2, shown is an example 200 of a system operating in accordance with techniques herein. The example 200 includes a client 210 and a server 212. In one embodiment in accordance with techniques herein, the client 210 may be a system including data storage system management software, and the server 212 may be a data storage system. In the example embodiment where the server 212 is a data storage system and the client 210 includes data storage system management software issuing the request 214, element 220 may be a data store including data storage configuration information describing the current configuration of the data storage system. The data store 220 may be, for example, a database, or more generally, any suitable data container of the data storage configuration information.

In one embodiment, the data store 220 may be an SQL (Structured Query Language) database such as PostgreSQL (also referred to as "Postgres") which is an object-relational database management system (ORDBMS) with an emphasis on extensibility and on standards-compliance. As a database server, Postgres may be used to store data securely and to allow for retrieval of data at the request of other software applications.

The client 210 may issue a request 214 to the server 212 where the request 214 uses a REST API in accordance with techniques herein. The request 214 may be an HTTP request to read or GET data storage configuration information from the data store 220, or otherwise performs an operation that creates or modifies existing configuration information.

In response to receiving the request 214, the server 212 may perform processing to service the request. Such processing may vary with the particular request. For example, for a GET request, processing performed may include retrieving information from the data store 220, and performing sorting or ordering as may also be specified in the request. For a request to create a new storage entity, such as provision storage for a new LUN, processing may include creating one or more new objects in the data store 220. Once the server 212 has completed processing for the request, the server sends a response 216 to the client including any requested information.

It should be noted that examples described herein may refer to a client that is an application including a GUI. However, techniques herein may be used more generally in an embodiment with any suitable client including one that does not have a GUI. Additionally, techniques herein may also be illustrated with reference to an embodiment where the client and server are on two different systems and where the server is a data storage system. More generally, the client and server may be any suitable system or component (e.g., server does not have to be a data storage system). Furthermore, the client and server may both operate in the same physical system. For example, as a variation to an embodiments described herein, the client (as the GUI-based data storage management application) may execute on processor of the data storage system itself where client requests are serviced using a database also located on the data storage system or otherwise accessible to the data storage system.

Telemetry may be defined as an automated communications process by which measurements and other data are collected at remote or inaccessible points and transmitted to receiving equipment for monitoring. Although the term commonly refers to wireless data transfer mechanisms (e.g., using radio, ultrasonic, or infrared systems), it also encompasses data transferred over other media such as a telephone or computer network, optical link or other wired communications like power line carriers.

In connection with at least one embodiment in accordance with techniques herein described in following paragraphs, the telemetry service may be a background service that collects RESTful API service consumption data characterizing usage of received client requests. With reference again to FIG. 2, such collected consumption statistics, or more generally, collected consumption or usage information 221 may be collected by the data storage system or server 212 through monitoring received client requests 214 for data storage management commands and operations, and extracting desired information, statistics or metrics based on the client requests. Periodically, the data storage system or server 212 may transmit 222 the collected data 221 regarding consumption or usage of various aspects of the management requests to another location, such as a remote data center 230 where the collected data may be further analyzed for any suitable purpose. For example, such collected data 221 may be examined to determine improper usage of a particular command or operation as well as opportunities to simplify and enhance services. In one aspect, techniques described in following paragraphs may be characterized as a proactive statistics collection process and workflow to collect desired information, statistics or metrics regarding the particular operations, services, parameters, and the like, included in the received client requests. Thus, the proactive collection of statistics and other information regarding usage of aspects of the API in client requests provides feedback regarding actual usage by the clients of the various existing operations, services, features, parameters, and the like, included in the received client requests. The collected consumption information 221 may denote a data container, such as a data base or other container used to store the collected consumption data. Generally, data container 221 may be similar to element 220 described elsewhere herein.

In at least one embodiment in accordance with techniques herein, the data containers 220 and 221 are databases each including tables of objects. For example, data container 220 may include a different table of objects for each object type (e.g., object type being one of pools, LUNs, disks or physical storage devices, and the like). In a similar manner, data container 221 may also include tables of objects where such tables include metadata for the RESTful API. Data container 221 may store information for each object type regarding the various valid properties, actions and arguments that may be specified in connection with RESTful API requests from clients. In connection with the telemetry service and associated metadata counts collected in connection with techniques as described herein, additional database columns may be persisted to those metadata tables of the database 221 regarding applicable counts and other information collected for each particular API and associated action. In this manner, once the additional telemetry data collected has been added to the data container 221 implemented as a database, database queries may be issued to 221 to obtain any desired telemetry information. As discussed elsewhere herein, a log of requests received from clients may also be persisted to the data container 221. The foregoing and other aspects of the telemetry service are described in more detail elsewhere herein.

In at least one embodiment, a service, such as a secure remote service (SRS) 203 located on the data storage system or server 212 may periodically (e.g., at each occurrence of a defined time period) push, send, or report the collected consumption data 221 to the remote data center 230. New consumption data stored in 221 may be collected during an elapsed period of time regarding client requests received during that time period. At the end of the period of time, the SRS may then report the newly acquired consumption data 221 (acquired since the previous SRS reporting) to the remote data center 230. The remote data center 230 may aggregate and analyze usage information collected from multiple data storage systems and customers for any suitable purpose such as, for example, to prioritize and identify existing features, services and/or commands for further development and improvement; identify unused or infrequently used features, commands, and/or parameters; and identify potential user interface enhancement. The foregoing as well as other potential uses of the usage information are described in more detail elsewhere herein.

Figure 3:
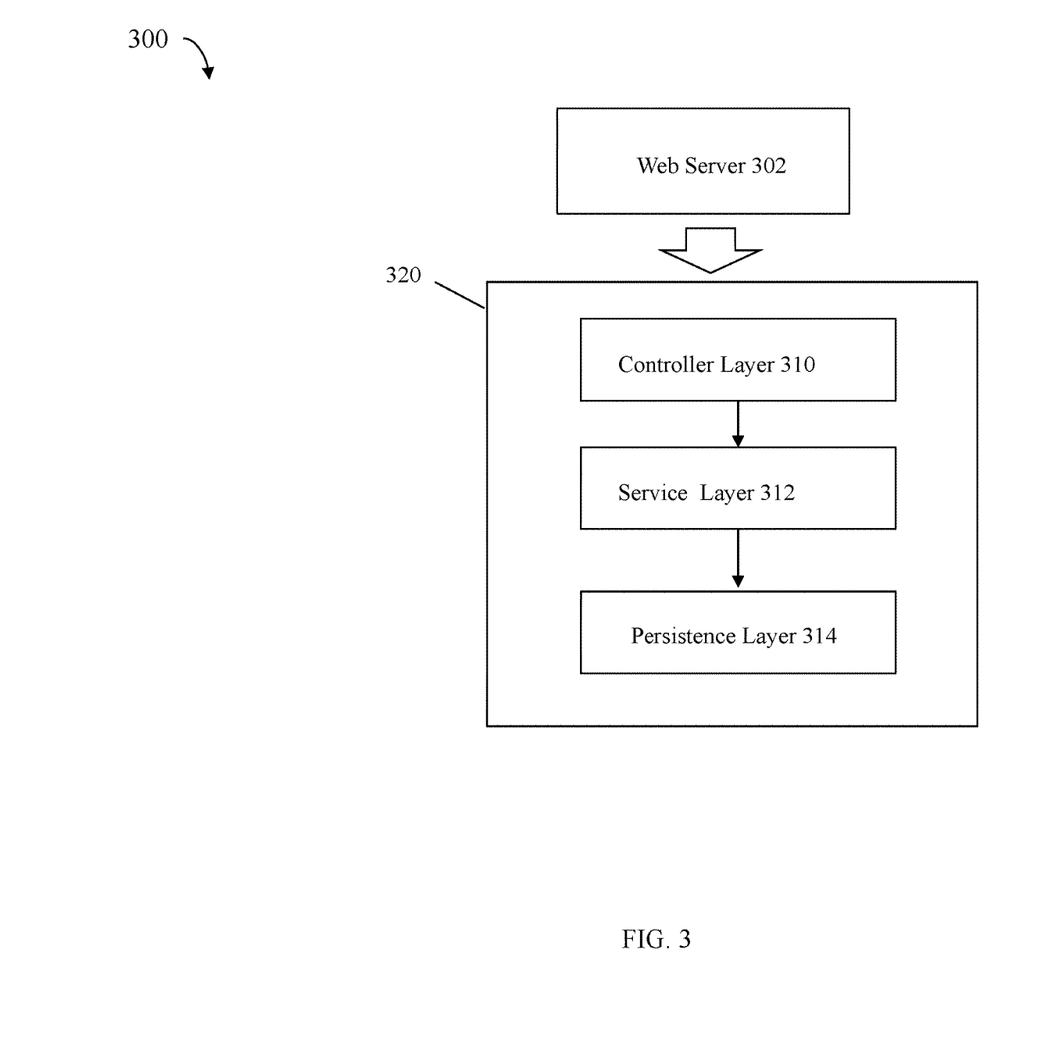
FIG. 3 is an example illustrating components that may be included in an embodiment of a server, such as a data storage system, in accordance with techniques herein.

Referring to FIG. 3, shown is an example 300 illustrating additional components of a web services architecture in an embodiment in accordance with the techniques herein. In at least one embodiment, the components of the example 300 may be included in the server 212, such as a data storage system. The client request, such as from a host, may be received on the data storage system and authenticated by the web server 302. Generally, authentication techniques are known in the art. For example, authentication of a request may include validating that the request includes information identifying the requester as an authorized user of the data storage management software with a valid password. Once the request has been authenticated, the request may be transmitted to servlets container 320. The request is received by the controller layer 310 that authorizes and sanitizes the request. For example, the controller layer 310 may perform processing which ensures that the request is properly formed with no syntax errors and includes only valid parameters. The service layer 312 then prepares persistence parameters and persistence command(s) for the request (e.g., to implement the request and perform processing to service the request). In at least one embodiment where the data storage system configuration data 220 is a database, the service layer 312 may, for example, map or translate the received client request to one or more SQL or other database language commands used to access the database 220 of the data storage system configuration information. The persistence layer 314 may read and execute the SQL or other database language commands. In at least one embodiment, the client request may be serviced as an asynchronous request, or a synchronous request. For synchronous requests, the response may be returned to the client (that originated the request) after the request processing has completed (e.g., after the corresponding SQL or other database language commands forming the persistence command(s) have been executed). For asynchronous requests, a background job may be created which implements or services the request, such as by executing the corresponding SQL or other database language commands forming the persistence command(s). For asynchronous requests, the response may be returned to the client after the background job servicing the request has been completed.

In at least one embodiment, the model driven architecture approach defines system functionality using a platform-independent model using an appropriate domain-specific language. Consistent with other discussion herein with this embodiment, a RESTful model is defined to represent a logical view for physical and logical storage components or entities as well as feature components or entities. Each model class represents one component or entity type. For example, in at least one embodiment, a model class may exist for each of the following types: storage pools, logical devices or LUNs, physical storage devices such as disks, file servers, file systems, and the like. Each model class comprises properties and capabilities or features of the particular model class. For example, for a logical device or LUN class, the properties may include provisioned storage capacity, amount of unused capacity, and the like. A capability or feature of a LUN may be a snapshot or other data protection option (e.g., replication) that may be applied to the LUN. The RESTful services provide interfaces such as APIs for consumers to query properties of the specific model class (e.g., amount of unused storage capacity of the LUNs) and perform operations derived from its capabilities or features (e.g., create a snapshot of a LUN, define a snapshot schedule for a LUN, specify snapshot parameters).

Figure 4:
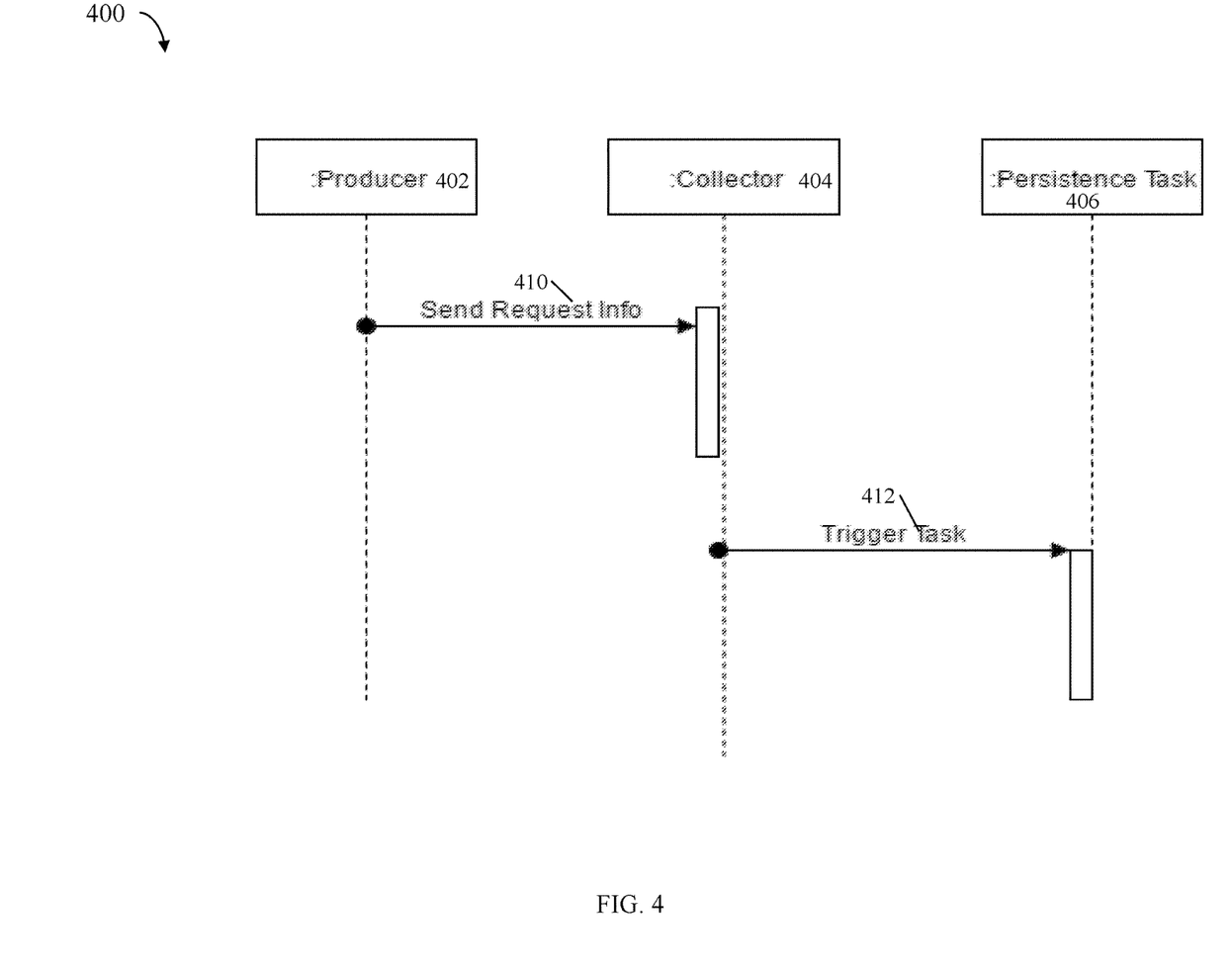
FIG. 4 is an example of a sequence diagram regarding component interactions in an embodiment in accordance with techniques herein.

With reference to FIG. 4, shown is a sequence diagram illustrating interactions among the components of the telemetry service. In at least one embodiment in accordance with techniques herein, telemetry service may include three components—a producer 402, a collector 404, and a persistence task 406. The producer 402 may generally service the requests as received from the host or other client. The producer 402 may extract desired information from the request and forward (410) such information to the collector 404. For example, the producer 402 may send (410) a message to the collector 404 identifying the particular command or operation of the request and additionally identifying the various parameters, attributes or options specified in the request for the particular command. Such information may also be characterized as command or request metadata. The collector 404 receives the command or request metadata and coordinates persistence tasks. In particular the collector 404 decides whether a trigger condition exists that triggers (412) the collector 404 to invoke the persistence task 406 to persistently store request metadata to the collected consumption information database 221.

Figure 5:
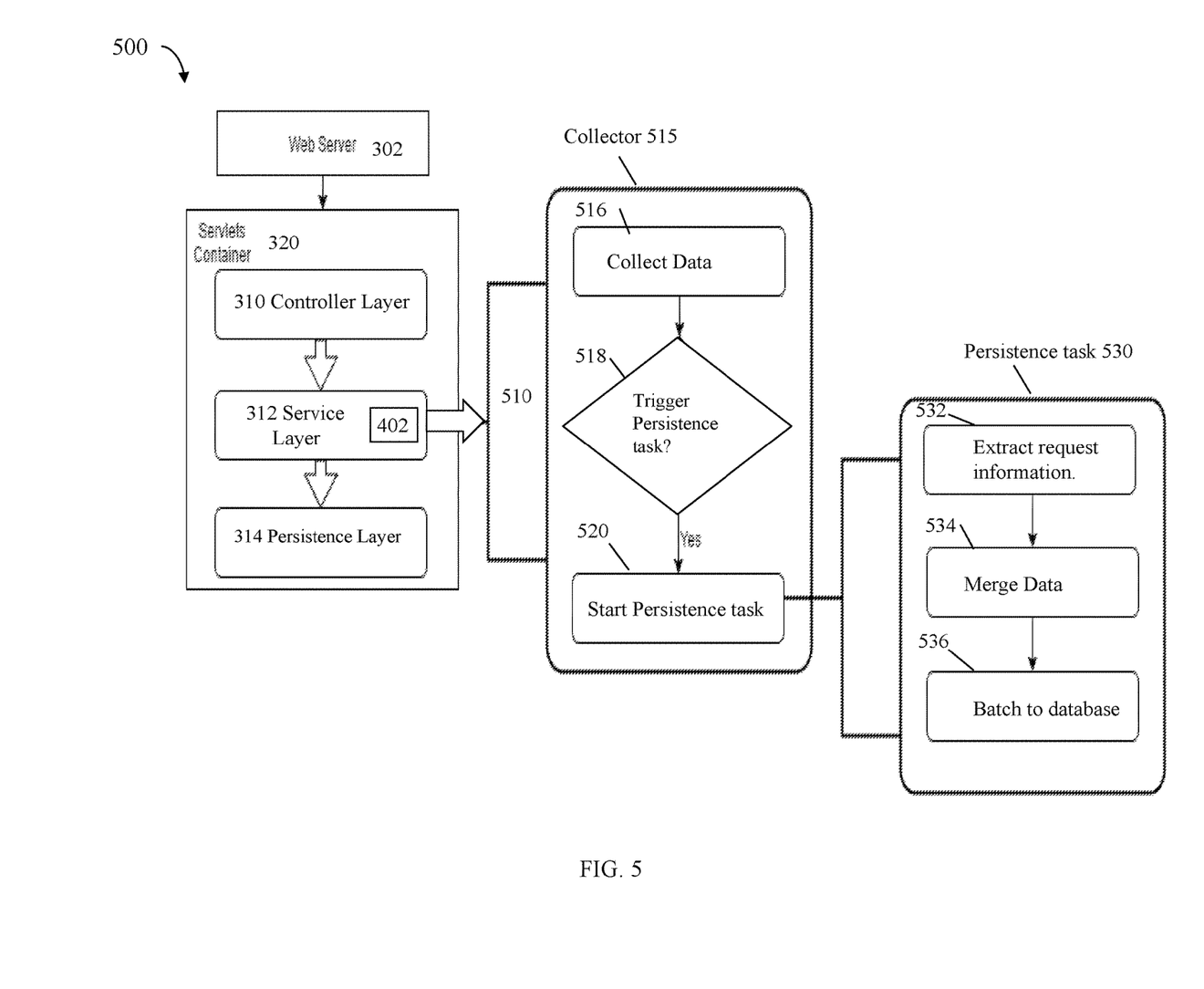
FIG. 5 is an example illustrating work flow in connection with various components in an embodiment of a server, such as a data storage system, in accordance with techniques herein.

Referring to FIG. 5, shown is an example illustrating processing performed by components of the telemetry service in an embodiment in accordance with techniques herein. The example 500 includes the components 302, 320, 310, 312 and 314 as illustrated and described above such as in connection with FIG. 3. In at least one embodiment, the producer 402 may be resident in the service layer 312. Although the telemetry service may generally benefit more as more usage data is collected, all requests received may not be useable or useful in connection with collected usage data for the telemetry service. For example, some received requests may be unauthenticated or otherwise not contain correct authentication information (e.g., authentication of the request fails such as failure to provide a valid user name and password). Some received requests may be unauthorized whereby the requester with a particular user name and password may not have the proper authority or privilege to perform a particular operation. Some received requests may also be invalid or malformed requests, such as may include improper parameters or improper value for a parameter, not include all expected or required parameters, may contain syntax errors, and the like. As such, the invalid request may result in an error and the system may not be able to service or perform the request. Requests such as the foregoing (e.g., invalid, unauthenticated (or improperly authenticated), unauthorized) may be ignored for purposes of telemetry service usage data collected in accordance with techniques herein. In this manner, the producer 402 may be located in the service layer 312 and invoked at a point in runtime processing after any desired authentication, authorization and validity checking of the request and associated parameters has been completed. For those requests which reach the producer 402 and have successfully passed any desired authentication, authorization and validity checking of the request, the producer 402 may extract the various parameters and command information of the request in the form of metadata information about the request. The producer 402 may send a message to the collector where message includes the request metadata information. In at least one embodiment, the message may be placed in an incoming message queue 510 including messages of request metadata information for the collector.

Element 515 denotes processing that may be performed by the collector where the collector receives messages of request metadata information from the queue 510 and determines whether a trigger condition or event has occurred which triggers the persistence task execution. Generally, the collector collects data 516 transparently through use of the message queue 510. To reduce performance penalty that may be experienced by I/O processing and other tasks on the data storage system, the collector 515 may be implemented as a background service collecting data from the producer. Additionally, in at least one embodiment, the producer provides the request metadata information based on "best effort" delivery to the collector. If the producer fails to complete delivery of the message including the request metadata information such as due to a full message queue 510, the message sending may not be retried.

The collector service 515 may determine the proper strategy to persist the collected usage data based on one or more defined trigger conditions. When one such trigger condition occurs (518) as determined by the collector 515, the collector triggers execution 520 of the persistence task. For example, in at least one embodiment, the collector may trigger the persistence task to persistently store the collected usage based on elapsed time (since the last persistence task execution) and also based on an amount of data or requests for which data is collected in the queue 510. For example, in one embodiment, the collector may trigger execution of the persistence task every 5 minutes or if 5 minutes has elapsed since the last time the persistence task was invoked. The collector may trigger execution of the persistence task once the queue 510 has reached a threshold capacity of 200 messages of request metadata information awaiting further processing and persistent storage. Upon the occurrence of any one of the foregoing or other defined trigger conditions, the collector may spawn an instance of the persistence task to process the latest set of messages (e.g., messages that have accumulated in the last 5 minute time period or the last 200 messages) that caused the trigger condition.

The collector service 515 may also control the number of persistence tasks spawned as a result of executing 520. In at least one embodiment, each execution of step 520 may result in spawning a new instance or occurrence of a persistence task to persistently store a set of collected usage data (messages) to the data container 221. In at least one embodiment, a maximum number of allowable persistence tasks may be specified denoting the maximum number of persistence tasks that may be executing at a point in time on the data storage system. In this manner, limits may be placed on the amount of system resources (CPU, memory and the like) allowed to be consumed in connection with the telemetry service. Once the current number of active spawned and executing persistence task instances reaches the maximum number, the collector may be blocked from spawning further persistence task instances for execution until other task instances complete execution thereby releasing associated CPU and memory resources.

Element 530 outlines processing performed by an instance of the persistence task. Generally, the persistence task persists request data for a set of messages (requests) to the database 221. The persistence task may extract 532 information regarding the various parameters for the same model elements or type of component from each request and then merge or aggregate 534 such data. For example, for all requests which create the same type of logical entity such as a file system, information may be extracted and aggregated across all requests in the set to determine how many requests were made with respect to file system entities, how many requests were of each particular file system operation (e.g., how many create file system operations, how many delete file system operations), and how many requests for a particular file system operation, such as creating a file system, specified each particular parameter or option (e.g., size or capacity parameter on file creation, enabled compression on file system creation, enabled storage on thin or virtual provisioned LUNs on file system creation, created a particular file system type such as NFS (network file system) on file system creation). Thus, step 534 may include determining counts or quantities regarding a number of times each particular file system operation and each particular parameter or option is specified in a command request received on the data storage system.

Step 534 may also include extracting collected information regarding observed sequences of commands requests counting the number of times each observed sequence is detected. Thus step 534 may also include monitoring the order in which particular requests are issued by the client in order to detect a particular request pattern. For example, a sequence of requests may be detected in which the first request creates a new storage pool, a second request creates a new file server and a third request creates a new file system specifying the newly created storage pool (created with the first request) and the newly created file server (created with the second request) as parameters of the third request. The collected information for the foregoing sequence of 3 requests may be observed (as a consecutive sequence) multiple times within the same set of requests. For example, 4 clients may have issued the foregoing sequence of requests where the step 534 may detect the 4 occurrences of the sequence of 3 requests. The foregoing is just one example of a sequence of different request commands or operations that may be observed and detected multiple times across client requests. Such information regarding detected sequences of requests and the number of occurrences may be reported by the data storage system to the remote data center. Subsequently, the remote data center may further aggregate and analyze the usage information (as reported from multiple data storage systems. As a variation to detecting and tracking sequences of requests performed on the data storage system, a log of received client requests may be collected by the data storage system and the request log may be stored in the data container 221 and then transmitted to the remote data center 230 for further analysis and processing. Thus, detecting and tracking patterns of sequences of requests may be performed by the data storage system and/or the remote data center.

In step 536, the persistence task may determine one or more SQL or other database commands to be executed to persistently store the usage data for the requests to the data container 221. As part of step 536, the SQL or other database commands may be executed to store the usage data to the data container 221.

Described herein is a robust and scalable telemetry service. The producer may be placed or introduced into the runtime processing as described herein to obtain information in connection with proper, validly formed and authenticated requests. A collector service as described herein may ensure the service is under a limited memory/CPU budget and minimizes the performance penalty incurred by the data storage system. The persistence task processes the request data to aggregate information across requests directed to the same type of storage entity, service or feature. In at least one embodiment, the aggregated usage information regarding the processed requests may be written to the data container 221 as a database transaction. The telemetry service may be integrated with other components, such as SRS 203, that collects data and forwards collected data periodically to another location or site, such as a remote data center 230. The remote data center 230 may perform further data mining, processing and analysis of the collected consumption information to facilitate an understanding of how RESTful API services of the data storage system management software are used by clients or customers (that issue the client requests received by the data storage system). Such further analysis may be used, for example, to prioritize features for further development or improvement. For example, those services, operations, parameters, sequence of instructions, and the like, that are most commonly used may be targeted as having the highest priority for further development, improvement, and the like. For example, a commonly used sequence of operations or commands may be detected and a GUI wizard may be developed to streamline and enhance user interactions to perform the sequence. Rather than have the user independently issue requests for the different operations or commands of the sequence, the wizard may logically guide the user through a defined sequence of interactions prompting the user to enter, for example, input values for valid command options. In this manner, the wizard may provide an improved user interface to facilitate issuing and executing the sequence of operations or commands in the appropriate order and with suitable parameters and options.

As another example, an embodiment in accordance with techniques herein may also collect data regarding particular invalid or malformed requests of interest. For example, by monitoring requests it may be determined that users commonly omit a required parameter or option from a particular command or operation and thereby may result in an error condition where the request cannot be serviced. For example, a request to create a new file system may require that values be specified for one or more parameters be included in the request. For example, a request to create a new file system may require that the create file system command include a parameter specifying an existing storage pool or RAID group from which storage is provisioned for the file system. The collected usage information may indicate a relatively high frequency of occurrence of requests which omit specifying one or more required parameters. As such, the collected usage information may identify an area of prioritized improvement with respect to the create file system command. For example, the create file system online help or other command user documentation may be reviewed to ensure and improve description regarding required parameters. The user interface may be improved, for example, to prompt the user for required parameters that are omitted such as, for example, by displaying a list of existing storage pools or RAID groups to the user when omitted and prompting the user to select one from the list for use with the create file system command. As another example, a GUI wizard may be created or otherwise improved to ensure that the request to create the file system is not actually sent to the data storage system until the user provides valid inputs for all required create file system parameters.

As another example, a particular operation or command, or a particular command parameter/option may be identified as unused (count=0) or as having a low usage (e.g., count<specified threshold, or have a low relative ranking with respect to other commands, command parameters/options, features, and the like). Such low usage may identify one of several issues. For example, an unused command, command parameter, or features may indicate that customers do not need such functionality and may be a candidate for possible removal. Such an observed unused item may also be unused for other reasons, such as due to customers not being aware of the particular command that is unused, or due to complexities or difficulties of the unused command. In this case, customer education and awareness of the unused command may be needed. For example, online help and documentation in the UI may be improved/enhanced regarding the unused command (e.g., improved description, additional and improved examples of possible uses of the unused command; GUI may be modified to provide the user, through the GUI, with hints or tips which may identify the unused command, operation, or other unused functionality in efforts to increase customer awareness of the particular functionality).

In at least one embodiment in accordance with techniques herein, client requests may include query commands or requests, such as in the form of an HTTP Get request having a general form of:

GET resource(s) query parameter(s)

where:

resource(s) identifies one or more resources for which information is to being requested. A resource may be a storage component or entity in the data storage system configuration as described herein. Such a resource may be identified by specifying an object type or a class of objects such as a class or type of logical component (e.g., LUN, file system, server/file server), physical component (e.g., disk, SP), or feature/service (e.g., replication, snapshot, clone). The resource may also denote all occurrences of the particular object type or class as well as particular instances of the object type or class. For example, the resource(s) portion of the GET request may denote all instances of the object type (e.g., such as requesting properties for all existing LUNs) or may request information for particular object instances (e.g., LUNs having particular identifiers).

Query parameter(s) denotes one or more query parameters of the GET request. The parameters may, for example, identify one or more properties to be returned for the specified object type or class. The query parameters may be optional and may vary with object type. Thus, the one or more properties may vary with object type and may also be optional. By default, all properties of all objects of the particular object type (denoted by the resource(s)) may be returned.

For example, the following is an example of a query or request that may be issued from the client to return values of two predefined properties for all POOL objects:

GET https://10.108.49.209/api/types/pool/instances?fields=sizeTotal,sizeUsed

The above is an example of a request that may be issued by a client, such as the data storage system management software, to obtain two object properties of sizeTotal and sizedUsed defined in the object model for all POOL objects. In the above GET request, "api/types/pool/instances" indicates the resources for which the GET query is performed; and "fields=sizeTotal,sizeUsed" following the "?" identify the query parameters specifying the particular properties to be returned for all pool objects. SizeTotal may represent the total size (e.g. amount of storage) in the POOL and sizeUsed may represent the amount of pool storage that has been used or consumed.

The telemetry service as described herein may collect usage information regarding GET requests such as, for example, counts regarding the total number of GET requests, and the number of GET requests for each object type (e.g., number of query requests for pool properties, number of query requests for file system properties, number of requests for LUN properties). Counts may also be obtained for requests for only specific properties of an object type (e.g. to determine whether one particular property is explicitly requested over other properties), and requests for all properties for an object type (e.g., which requests don't specify to only return a limited set of properties and rather just request to return all properties for the specified object instances).

In at least one embodiment in accordance with techniques herein, client requests may include other operations performed on object types where such operations may also modify data storage configuration information. Relevant counts and other statistics may be obtained in connection with such operations and their arguments or parameters.

Figure 6:
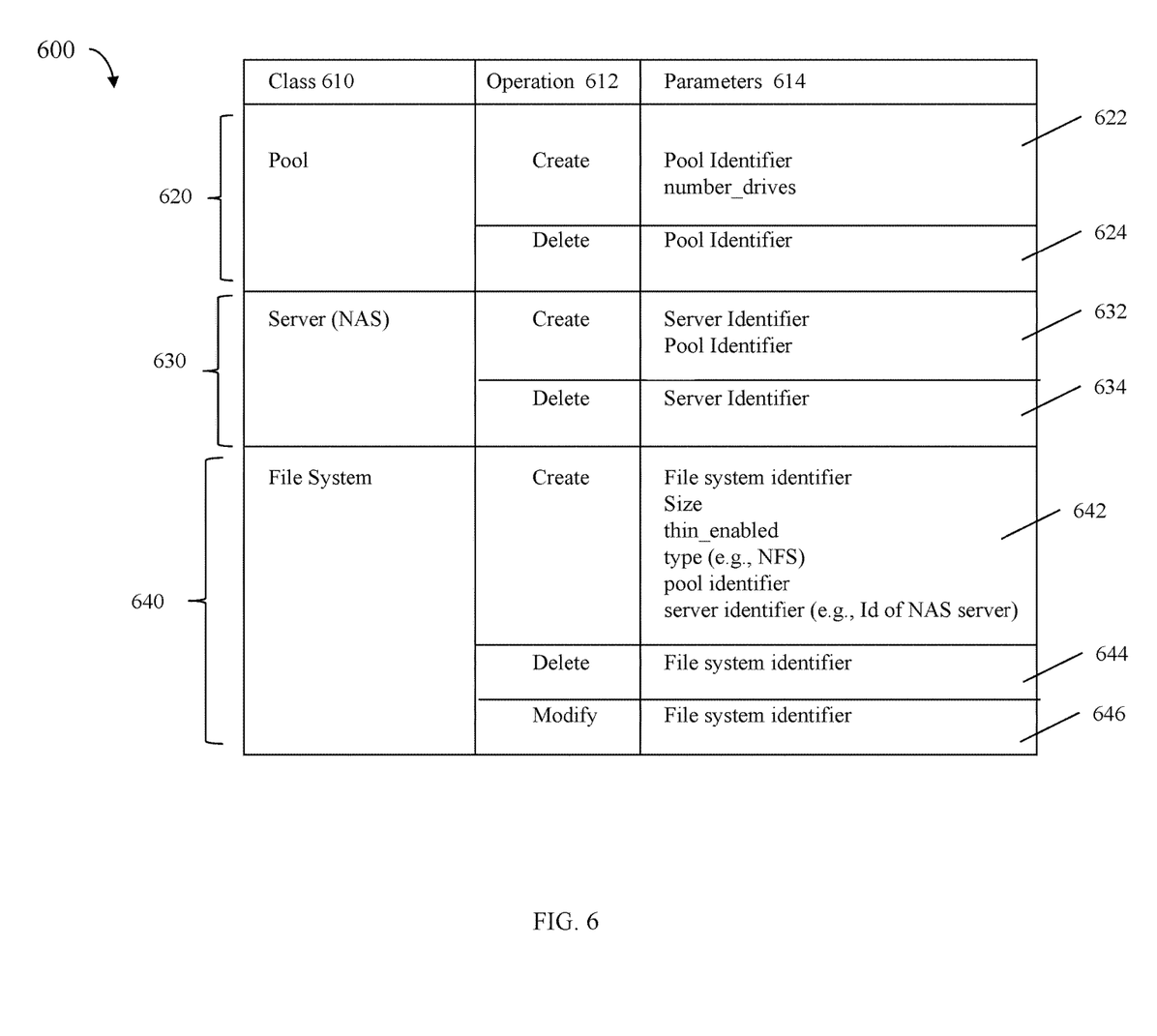
FIGS. 6 and 7 are examples of different object types or classes, operations and parameters that may be included in client requests in an embodiment in accordance with techniques herein.
Figure 7:
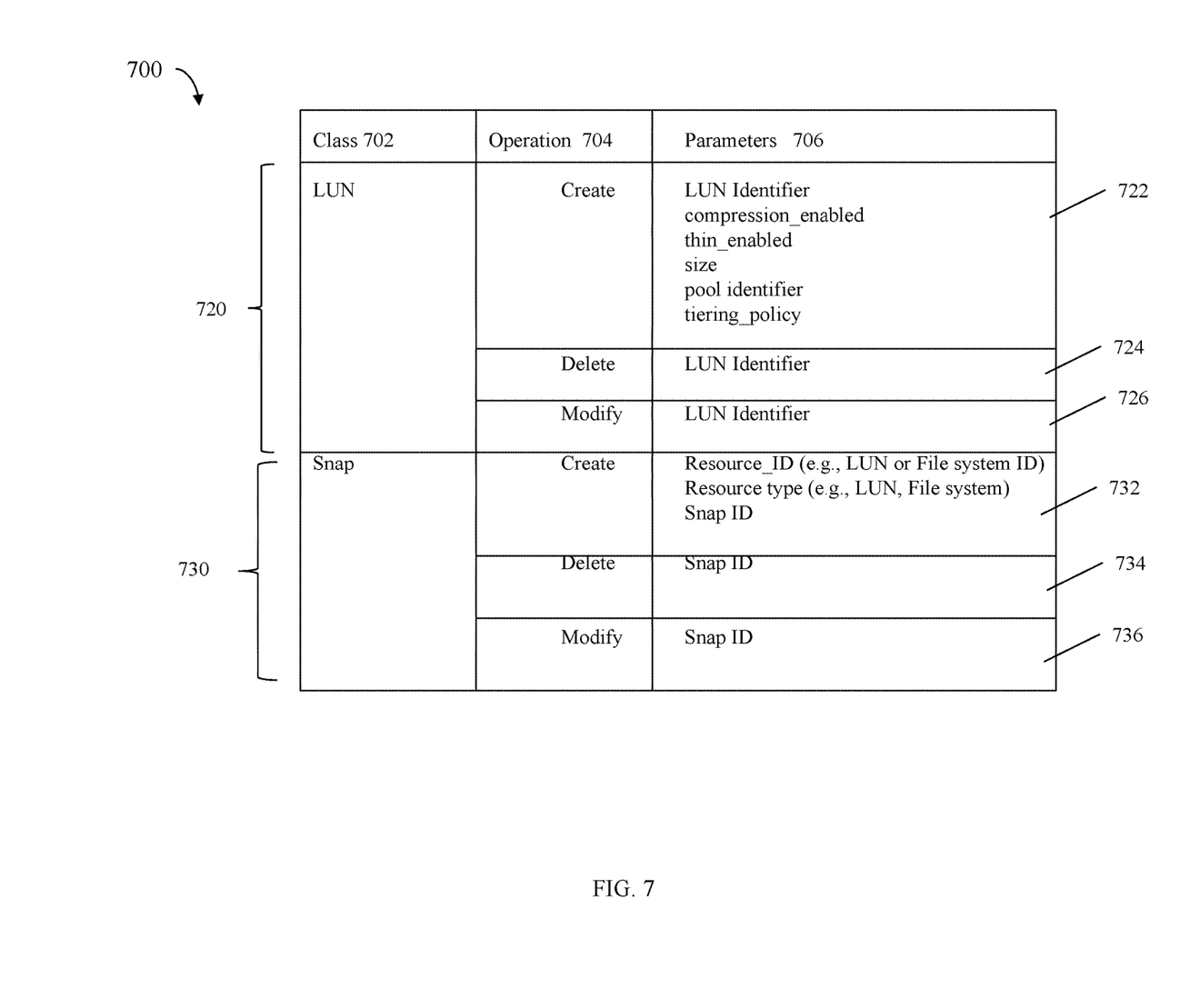

Referring to FIGS. 6 and 7, shown are examples of different object types or classes, associated operations and parameters that may be included in received client requests for which consumption or usage information may be collected by the telemetry service in an embodiment in accordance with techniques herein. It should be noted that the various object types or classes, operations and parameters in FIGS. 6 and 7 are only examples of some operations that may be supported in an embodiment in accordance with techniques herein.

Referring to FIG. 6, shown is a table 600 of including the following columns—object type or class 610, operation 612 and parameters 614. Element 620 denotes the different operations and associated parameters that may be included in client requests with respect to storage pool objects. Element 620 indicates that storage pool operations may include create and delete as well as possibly additional operations. Element 622 denotes that a create pool operation may be specified with parameters including a pool identifier (uniquely identifying the pool object or instance being created), number drives (denoting the number of physical storage devices or drives to be included in the pool), and possibly additional parameters. Element 624 denotes that a delete pool operation may be specified with parameters including a pool identifier (denoting the pool to be deleted) and possibly additional parameters.

Element 630 denotes the different operations and associated parameters that may be included in client requests with respect to server objects, such as NAS (Network attached servers) file server objects. Element 630 indicates that server (file server) operations may include create and delete as well as possibly additional operations. Element 632 denotes that a create server operation may be specified with parameters including a server identifier (uniquely identifying the server object or instance being created, a pool identifier (uniquely identifying the pool object or instance from which storage is allocated for use by the file server), and possibly additional parameters. Element 634 denotes that a delete server operation may be specified with parameters including a server identifier (denoting the server to be deleted) and possibly additional parameters.

Element 640 denotes the different operations and associated parameters that may be included in client requests with respect file system objects. Element 640 indicates that file system operations may include create, delete, and modify as well as possibly additional operations. Element 642 denotes that a create file system operation may be specified with parameters including a file system identifier (uniquely identifying the file system object or instance being created, size (denoting the initial size or amount of storage allocated for the file system), thin_enabled (denoting whether storage may be allocated for the file system from thin or virtually provisioned LUNs), type (denoting the file system type such as NFS (network file system) or other suitable supported file system types), pool identifier (uniquely identifying the pool object or instance from which storage is allocated for use by the file system), server identifier (denoting the NAS server that services this file system), and possibly additional parameters. Element 644 denotes that a delete file system operation may be specified with parameters including a file system identifier (denoting the file system to be deleted) and possibly additional parameters. Element 646 denotes that a modify file system operation may be specified with parameters including a file system identifier (denoting the file system to be modified) and possibly additional parameters.

Referring to FIG. 7, shown is a table 700 of including the following columns—object type or class 702, operation 704 and parameters 706. Element 720 denotes the different operations and associated parameters that may be included in client requests with respect to LUN objects. Element 720 indicates that LUN operations may include create, delete and modify as well as possibly additional operations. Element 722 denotes that a create LUN operation may be specified with parameters including a LUN identifier (uniquely identifying the LUN object or instance being created), compression_enabled (denoting whether compression is performed for the LUN or not), thin_enabled (denoting whether the LUN is a thin, virtually provisioned LUN having storage provisioned on demand as different portions of the LUN are written to, or a regular thick LUN having all its storage/provisioned allocated on creation), pool identifier (denoting the pool from which storage for the LUN is allocated), tiering policy (in an embodiment having multiple tiers of storage each having devices of a particular performance classification, the tiering policy may identify and affect which storage tier(s) from which storage is provisioned for the LUN, whether data portions for the LUN may be automatically relocated among different storage tiers such as based on varying I/O workload, and the like), as well as possibly additional parameters. Element 724 denotes that a delete LUN operation may be specified with parameters including a LUN identifier (denoting the pool to be deleted) and possibly additional parameters. Element 726 denotes that a modify LUN operation may be specified with parameters including a LUN identifier (denoting the pool to be modified) and possibly additional parameters.

Element 740 denotes the different operations and associated parameters that may be included in client requests with respect to snapshot objects. Element 720 indicates that snapshot operations may include create, delete and modify as well as possibly additional operations. Element 732 denotes that a create snapshot operation may be specified with parameters including a resource identifier (uniquely identifying the resource object or instance for which a snapshot is being created, such as an identifier of a LUN or file system), resource type (denoting the object type or class of the specified resource, such as LUN or file system), snap ID or identifier (uniquely identifying the snapshot being created), as well as possibly additional parameters. Element 734 denotes that a delete snapshot operation may be specified with parameters including a snap ID (denoting the snapshot instance to be deleted) and possibly additional parameters. Element 736 denotes that a modify snapshot operation may be specified with parameters including a snap ID (denoting the snapshot instance to be modified) and possibly additional parameters.

For the foregoing classes or types of objects, operations and parameters as described above in connection with FIGS. 6 and 7, the telemetry service as described herein may collect relevant usage statistics or information. For example, counts may be determined denoting the number of client requests for each of the different operations in columns 612 and 704 (e.g. number of requests that specified a pool create operation, pool delete operation, server create operation, LUN create operation, snapshot create operation, and the like). Additionally, counts may be determined for which particular parameters were specified in the received client requests. Some parameters may be required and other may be optional. In at least one embodiment, counts may be determined for optional parameters, for example, to determine frequency of use of particular parameters for the different operations. For example, for a LUN create operation, element 722 includes a thin_enabled parameter which may be an optional parameter whereby a count may be determined to record the number of client requests that actually implement thin or virtually provisioned LUNs (where storage is provisioned for the LUN on demand as data is written to different portions of the LUN logical address space) rather than thick or regular LUNs (where all storage is provisioned at creation). As another example, for a LUN create operation, element 722 includes a compression_enabled parameter which may be an optional parameter whereby a count may be determined to record the number of client requests that actually request compression of data stored on the LUN (as opposed to no compression where data is stored on the LUN in uncompressed form).

Consistent with discussion elsewhere herein, the usage information collected may include counts as well as any other desired statistics regarding the object type or class, operations and parameters. As noted above, the counts as well as other desired statistics may be collected. Additionally, a log of received requests may be recorded and used in connection with pattern detection of particular sequences of commands. In at least one embodiment, the log along with usage counts and other statistics may be stored in the data container 221 and periodically provided by SRS 203 to the remote data center 230.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of request processing comprising:
   receiving, at a data storage system, a plurality of data storage management requests from one or more clients, wherein the plurality of data storage system management requests include a first command issued to create a new file system, wherein said plurality of data storage management requests are in accordance with an application programming interface and perform different data storage system management operations with respect to data storage system configuration information defining a data storage system configuration of the data storage system;
   collecting usage information regarding the plurality of data storage management requests;
   periodically transmitting portions of the usage information to a data center;
   analyzing the usage information regarding the plurality of data storage management requests, wherein said analyzing includes monitoring a particular order in which at least two data storage system management requests are issued, wherein the at least two data storage system management requests include the first command issued to create a new file system;
   detecting, in accordance with said analyzing, a sequence of data storage system management requests that occurs a plurality of times, wherein the sequence comprises the at least two data storage system management requests that include the first command issued to create a new file system and that are observed as being issued in the particular order by said monitoring; and
   responsive to said detecting, providing a wizard that executes in a user interface of a data storage system management application, wherein the wizard is executed and logically guides a user through the sequence of data storage system management requests in the particular order and obtains input values for command parameters of the sequence of data storage system management requests, wherein the wizard performs processing that includes ensuring valid inputs are obtained for required parameters prior to sending the sequence of data storage system management requests to the data storage system.

2. The method of claim 1, wherein each of the plurality of data storage management requests is a request to perform an operation with respect to one or more objects each representing a component in the data storage system.

3. The method of claim 2, wherein the component is included in the data storage system configuration of the data storage system, and the component is any of a logical component, a physical component, and a feature or service.

4. The method of claim 3, wherein the component is the logical component and the logical component is any of a logical device, a storage pool, a file server, a file system, and a RAID group.

5. The method of claim 3, wherein the component is the physical component and the physical component is a physical storage device.

6. The method of claim 3, wherein the component is the feature or service and the feature or service is any of a replication facility, and a snapshot facility.

7. The method of claim 1, wherein said collecting is performed on the data storage system by a collector service that runs as a background service and that receives collected data storage management requests from a producer.

8. The method of claim 7, wherein the collector service periodically persists newly received data storage management requests to a data container.

9. The method of claim 8, further comprising:
   determining, by the collector service, whether one of a defined set of trigger conditions has occurred; and
   responsive to determining that one of a defined set of trigger conditions has occurred, performing processing by the collector service including spawning a persistence task to store usage information regarding collected data storage management requests to the data container.

10. The method of claim 9, wherein the defined set of trigger conditions includes a time-based condition indicating to spawn the persistence task if at least a threshold amount of time has elapsed since a last set of usage information was stored to the data container.

11. The method of claim 10, wherein the defined set of trigger conditions indicates to spawn the persistence task if at least a threshold number of data storage management requests are included in an input queue and are awaiting to have associated usage information stored to the data container.

12. The method of claim 11, wherein a maximum number of persistence tasks is specified and wherein at any point in time, there are no more than the maximum number of persistence tasks currently executing in the data storage system to store usage information to the data container.

13. The method of claim 12, wherein when a current number of persistence tasks executing is equal to the maximum number, the collector service is blocked from spawning additional persistence tasks.

14. The method of claim 1, wherein a plurality of sets of usage information is received by the data center from a plurality of data storage systems including the data storage system, and the method further comprising:
   performing analysis at the data center of the plurality of sets of usage information.

15. The method of claim 1, further comprising:
   performing first processing of the plurality of data storage management requests to ensure that the plurality of data storage management requests are valid;
   responsive to determining the plurality of data storage management requests are valid, performing said collecting for the plurality of data storage management requests; and
   responsive to determining that one or more of the plurality of data storage management requests are not valid, determining not to collect usage information for the one or more data storage management requests determined as not valid.

16. The method of claim 1, wherein the usage information includes counts regarding the different operations requested in the plurality of data storage management requests.

17. The method of claim 16, wherein the different operations include any of:
- a query request to return requested information regarding one or more entities in an existing configuration of the data storage system;
- a create operation that creates a new instance of an entity that is added to the existing configuration;
- a delete operation that deletes an existing instance of an entity currently included in the existing configuration; and
- a modify operation that modifies a parameter of an existing instance of an entity currently included in the existing configuration.

18. A computer readable medium comprising code stored thereon that, when executed, performs a method of request processing comprising:
- receiving, at a data storage system, a plurality of data storage management requests from one or more clients, wherein the plurality of data storage system management requests include a first command issued to create a new file system, wherein said plurality of data storage management requests are in accordance with an application programming interface and perform different data storage system management operations with respect to data storage system configuration information defining a data storage system configuration of the data storage system;
- collecting usage information regarding the plurality of data storage management requests;
- periodically transmitting portions of the usage information to a data center;
- analyzing the usage information regarding the plurality of data storage management requests, wherein said analyzing includes monitoring a particular order in which at least two data storage system management requests are issued, wherein the at least two data storage system management requests include the first command issued to create a new file system;
- detecting, in accordance with said analyzing, a sequence of data storage system management requests that occurs a plurality of times, wherein the sequence comprises the at least two data storage system management requests that include the first command issued to create a new file system and that are observed as being issued in the particular order by said monitoring; and
- responsive to said detecting, providing a wizard that executes in a user interface of a data storage system management application, wherein the wizard is executed and logically guides a user through the sequence of data storage system management requests in the particular order and obtains input values for command parameters of the sequence of data storage system management requests, wherein the wizard performs processing that includes ensuring valid inputs are obtained for required parameters prior to sending the sequence of data storage system management requests to the data storage system.

19. A system comprising:
at least one processor; and
at least one memory comprising code stored thereon that, when executed by said at least one processor, performs a method of request processing comprising:
- receiving, at a data storage system, a plurality of data storage management requests from one or more clients, wherein the plurality of data storage system management requests include a first command issued to create a new file system, wherein said plurality of data storage management requests are in accordance with an application programming interface and perform different data storage system management operations with respect to data storage system configuration information defining a data storage system configuration of the data storage system;
- collecting usage information regarding the plurality of data storage management requests;
- periodically transmitting portions of the usage information to a data center;
- analyzing the usage information regarding the plurality of data storage management requests, wherein said analyzing includes monitoring a particular order in which at least two data storage system management requests are issued, wherein the at least two data storage system management requests include the first command issued to create a new file system;
- detecting, in accordance with said analyzing, a sequence of data storage system management requests that occurs a plurality of times, wherein the sequence comprises the at least two data storage system management requests that include the first command issued to create a new file system and that are observed as being issued in the particular order by said monitoring; and
- responsive to said detecting, providing a wizard that executes in a user interface of a data storage system management application, wherein the wizard is executed and logically guides a user through the sequence of data storage system management requests in the particular order and obtains input values for command parameters of the sequence of data storage system management requests, wherein the wizard performs processing that includes ensuring valid inputs are obtained for required parameters prior to sending the sequence of data storage system management requests to the data storage system.

* * * * *